United States Patent [19]
Craig et al.

[11] Patent Number: 5,706,460
[45] Date of Patent: Jan. 6, 1998

[54] VARIABLE ARCHITECTURE COMPUTER WITH VECTOR PARALLEL PROCESSOR AND USING INSTRUCTIONS WITH VARIABLE LENGTH FIELDS

[75] Inventors: Jack W. Craig, San Jose; H. C. Kancler, Los Altos; C. W. McBride, Fremont, all of Calif.

[73] Assignee: The United States of America as represented by the Secretary of the Navy, Washington, D.C.

[21] Appl. No.: 672,213

[22] Filed: Mar. 19, 1991

[51] Int. Cl.⁶ .................................................. G06F 9/00
[52] U.S. Cl. .................. 395/380; 395/588; 395/590; 395/595; 395/563
[58] Field of Search ........................... 395/375, 800

[56] References Cited

U.S. PATENT DOCUMENTS

| | | | |
|---|---|---|---|
| 4,099,229 | 7/1978 | Kancler | 395/375 |
| 4,128,880 | 12/1978 | Cray, Jr. | 395/800 |
| 4,292,667 | 9/1981 | Catiller et al. | 395/375 |
| 4,449,184 | 5/1984 | Pohlman, III et al. | 395/250 |
| 4,556,951 | 12/1985 | Dickman et al. | 395/375 |
| 4,739,471 | 4/1988 | Baum et al. | 395/375 |
| 5,121,474 | 6/1992 | Sakamura et al. | 395/800 |

*Primary Examiner*—Richard L. Ellis
*Attorney, Agent, or Firm*—Kenneth Warsh; Darrell Hollis

[57] ABSTRACT

A variable vectored architecture digital computer provides real-time control computations for a rocket control system by executing efficient variable-length instructions optimized for such an application by means of a microprogrammed processor and variable length fields within each instruction concept. A parallel architecture with two streams of commands is used with a new command structure. A new, more powerful instruction set was implemented to increase the throughput. Included in these new instructions are a series of block type moves which allow large amounts of data to be moved by loops within the microprogram instead of loops of firmware instructions which are fetched over and over again for each memory address. The new mechanization allows the firmware instruction fields to vary in length from 1 to 16 bits instead of the fixed 4 bit or 12 bit bytes found in the prior art.

9 Claims, 14 Drawing Sheets

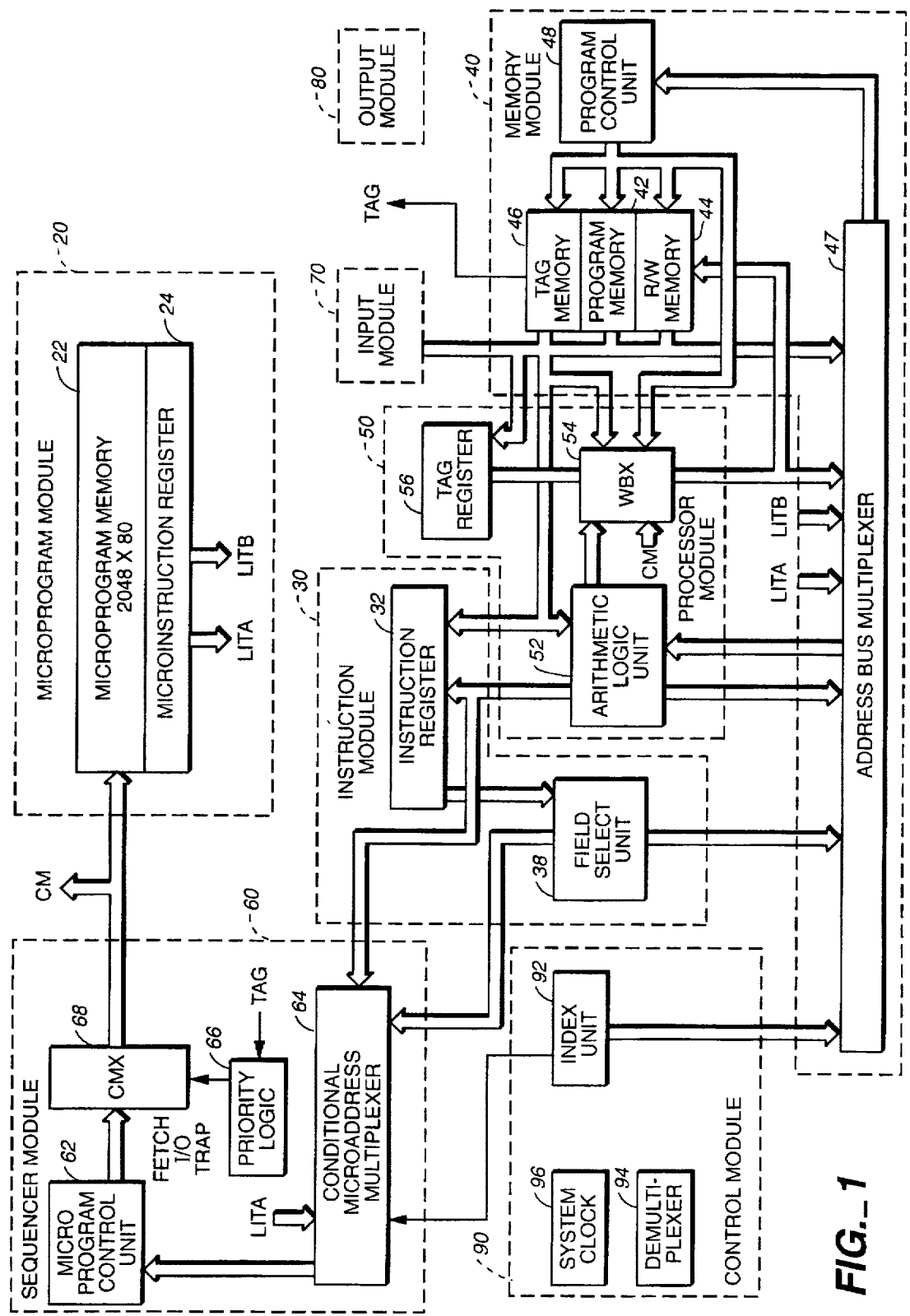
FIG._1

SHIFT REGISTER
INSTRUCTION REGISTER
FIELD SELECT UNIT
PROGRAM CONTROL UNIT
INDEX UNIT
ARITHMETIC UNIT
CLOCK GENERATOR
SHARED MEMORY BUFFER CONTROLLER
INPUT BUFFER
TELEMETRY
OUTPUT BUFFER
SUCCESSIVE APPROXIMATION REGISTER
MEMORY INTERFACE UNIT
INTERFACE UNIT

FIG._2

| OP CODE | INSTRUCTION |
|---|---|
| 0 | NO-OP |
| 1 | DECLARE |
|   | POP |
| 2 | IF R?S |
|   | IF R?N |
| 3 | IF R?0 |
| 4 | GOTO |
| 5 | STRING |
| 6 | CALL |
| 7 | RETURN |
| 8 | ASSIGN |
| 9 | SKIP |
| A | DYADIC OPERATION |
| B | IMMEDIATE OPERATION |
| C | MONADIC OPERATION |
| D | IDLE |
| E | FRAME TIME |
|   | CONASSIGN |
|   | XORSUM |
|   | PRODSUM |
| F | SAMPLE A/D |
|   | D/A OUTPUT |
|   | BLOCKOUT |
|   | BLOCKMOVE |
|   | GBUFOUT |
|   | TAG BLOCKMOVE |
|   | VBLOCKMOVE |
|   | PWM |

FIG._3

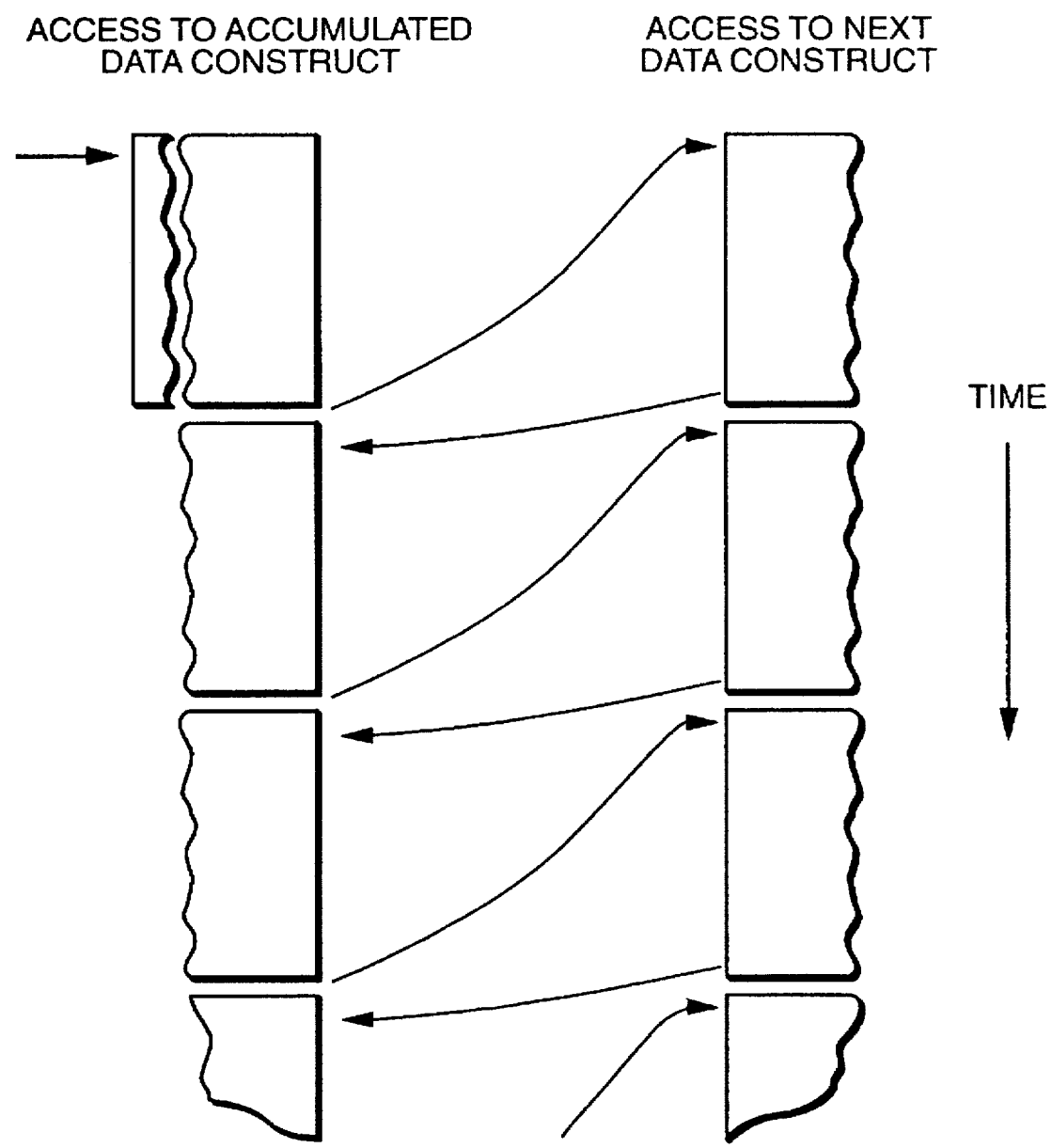
FIG._4

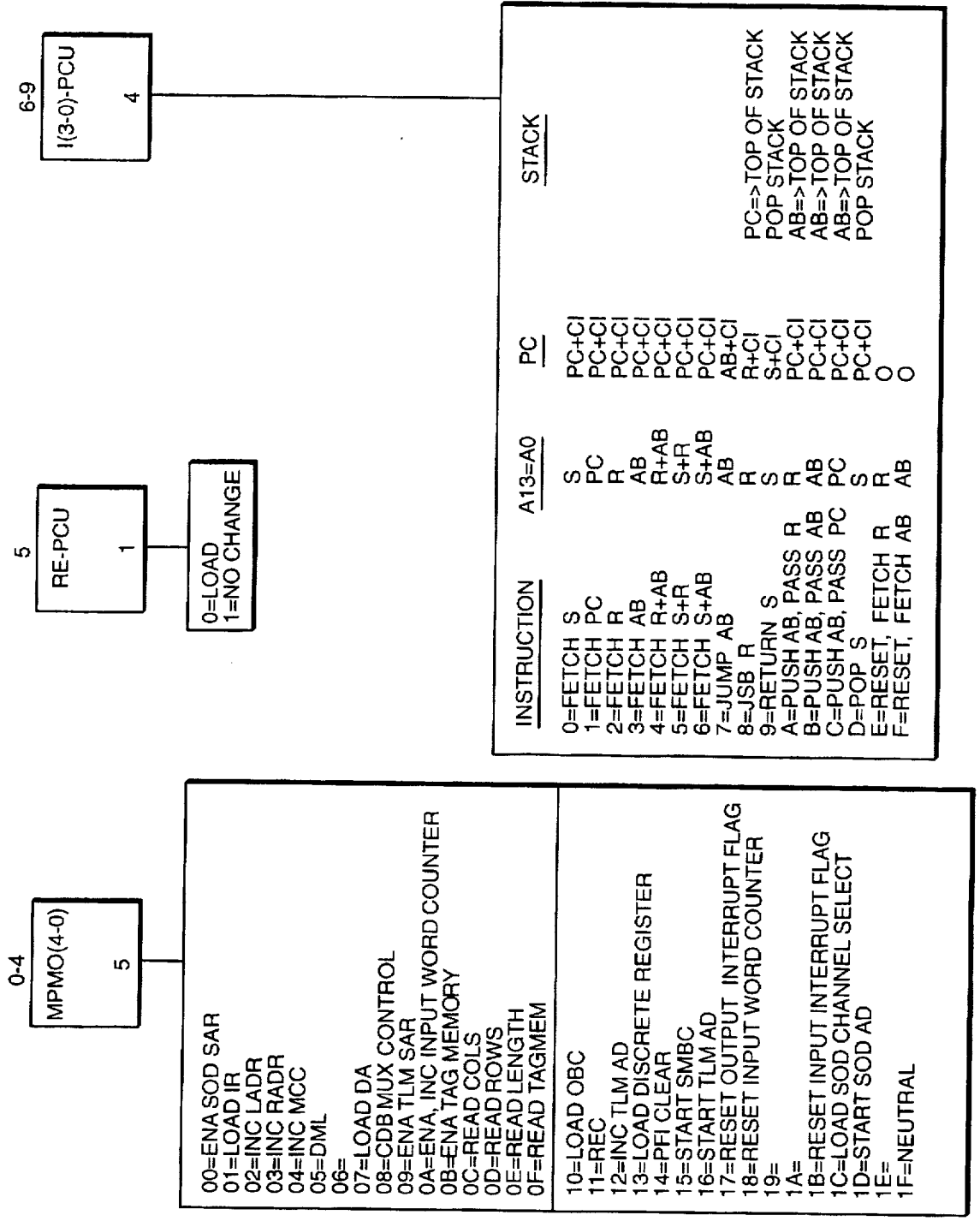
FIG._5A

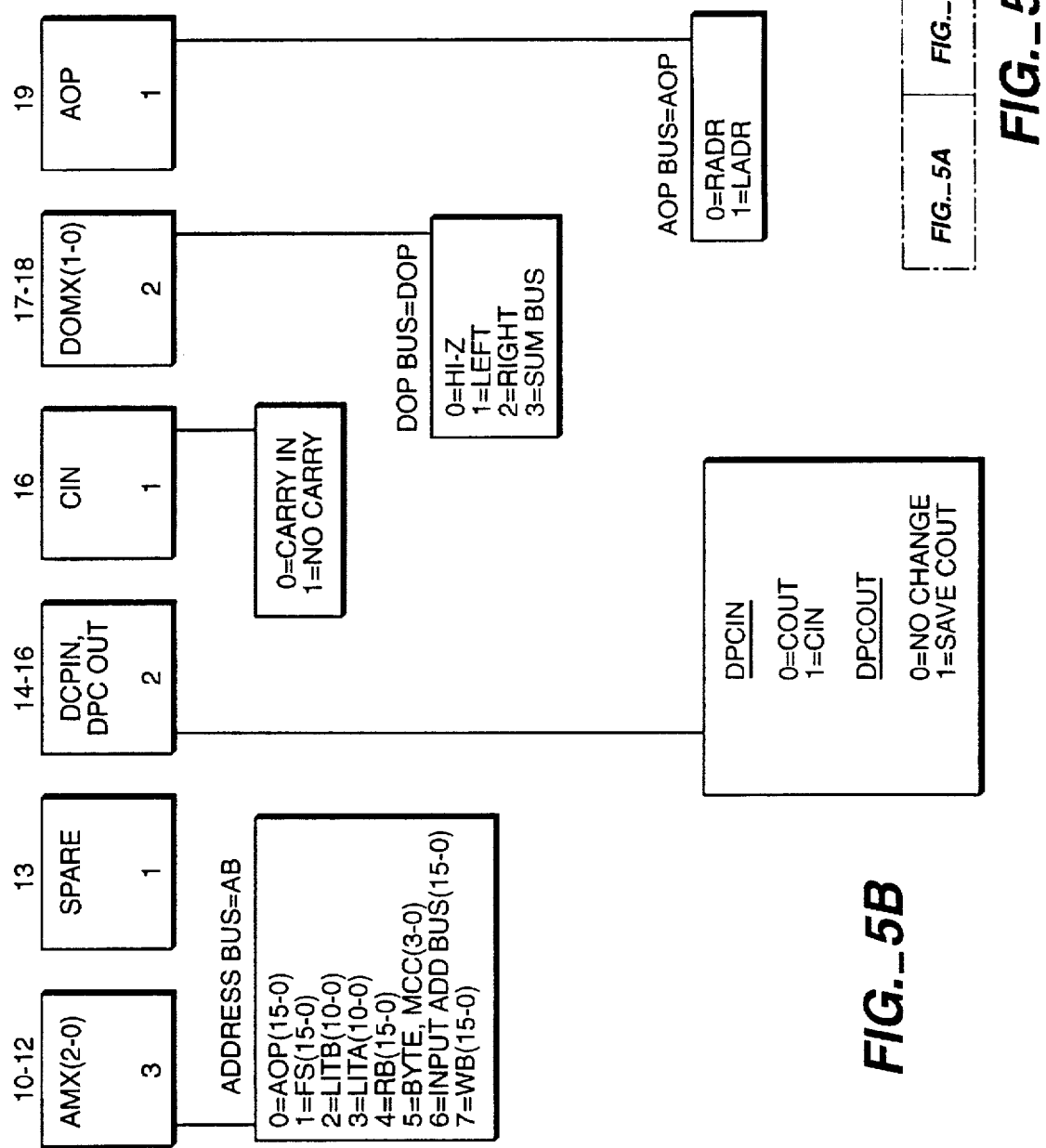

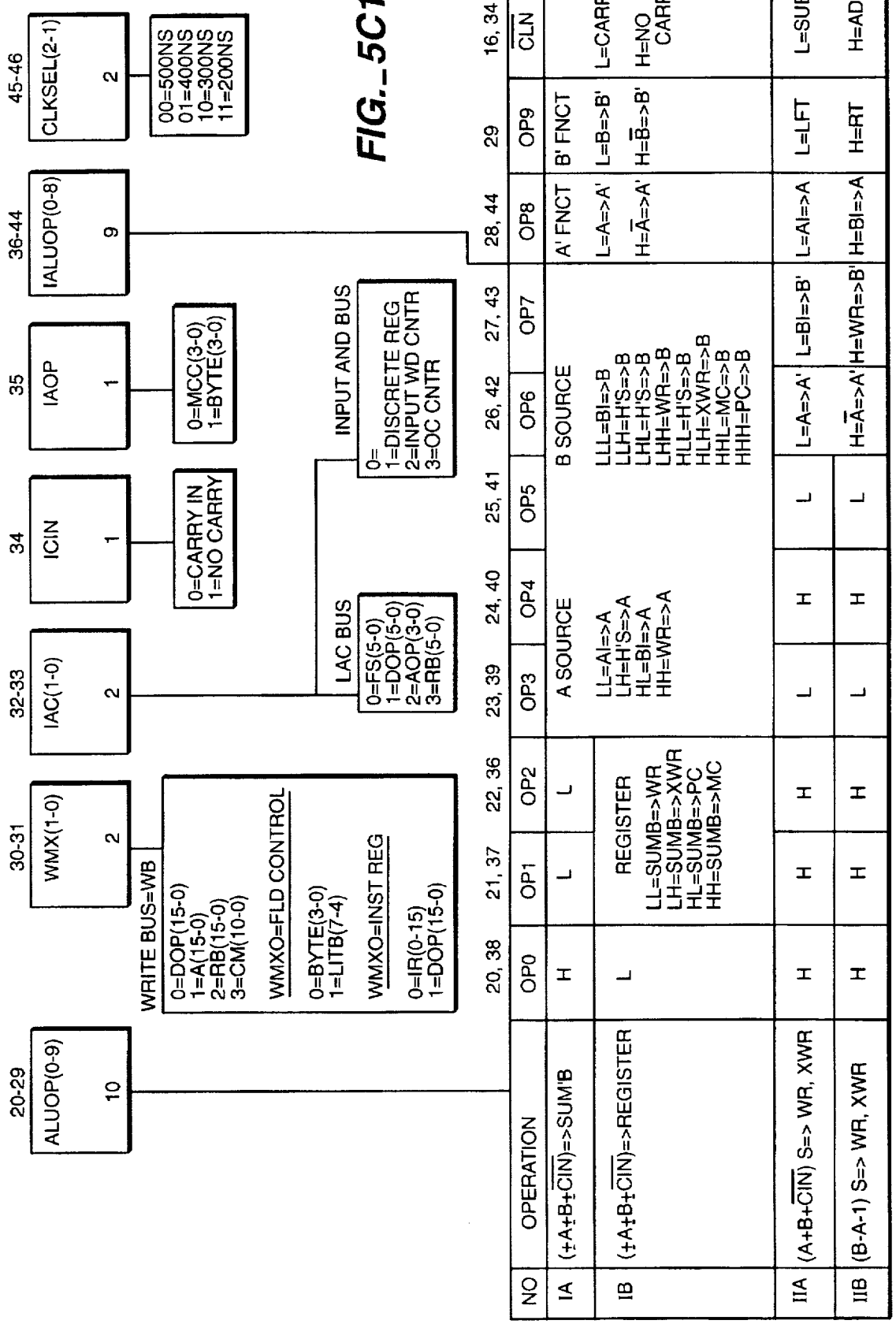

*FIG._5C2*

| | | | | | | | | | L=LOG H=ARITH | L=LFT H=RT | L=CARRY H=NO CARRY |
|---|---|---|---|---|---|---|---|---|---|---|---|
| III | (A+B+CIN)S=>REGISTER | H | H | H | H | L=AI=>A' H=BI=>A' | L=SUM=> MC H=SUM=> XWR | LL=BI=>B' LH=WR=>B' HL=XWR=>B' HH=LS=>B' | | | |
| IV | AI S=>SUM'B | H | H | H | L | H | H | LL=AI S=>SUM'B | | L=LFT H=RT | |
| VA VB | WR S=>WR XWR S=>XWR | H H | H H | L L | L L | H H | H H | LH=WR S=>WR HL= XWRS=>XWR | | LL=LOG LH=ARITH HL=ROTATE HH=NOT DEFINED | |
| VI | WR, XWR S=>WR, XWR | H | H | L | L | H | H | HH=WR, XWR S=>WR, XWR | | | |
| VIIIA VIIIB VIIIC | NOR/AND LOGICAL OR/NAND LOGICAL XOR/XNOR LOGICAL | H H H | H H H | LHL=NOR LHH=OR HLL=XOR | H | L=AI=>A H=WR =>A | LL=WR LH=XWR HL=PC HH=SUM B | LL=BI=>B LH=WR=>B HL=XWR=>B HH=PC=>B | | L=A=>A' L=B=>B' H=Ā=>A' H=B̄=>B' | SEE UNDER OP5 COLUMN |
| XIV | SIGNED MULTIPLY | H | H | H | H | L | H | L | | O/I | H |

| 54LS481 | AU | | INDEX UNIT | | OPERATORS | |
|---|---|---|---|---|---|---|
| BI AI WR XWR PC MC | RB(15-0) AB(15-0) LEFT(15-0) RIGHT(15-0) LADR(15-0) RADR(15-0) | | LITB(5-0) IAC BUS(5-0) COUNT(5-0) COUNT2(5-0) BYTE(3-0) MCC(3-0) | | S=> = SHIFTED AND DESTINED FOR => = DESTINED FOR O/I = O IS OUTPUT ON MSP I IS INPUT ON MSP | |

| AG | AU L=SUM'B<0 H=SUM'B≥0 | | INDEX UNIT OP9 =LOW CMCC =CARRY OUT MCC(3-0) ICOUT4=CARRY OUT BYTE(3-0) ICOUT =CARRY OUT COUNT(5-0) OR COUNT2(5-0) | | IOP0=OP2 IOP2=OP0 IOP8=OP8 OP9-INTERNALLY GROUNDED |
|---|---|---|---|---|---|
| EQL EQL2 | L=(SUM'B=0) H=(SUM'B≠0) | | | | |

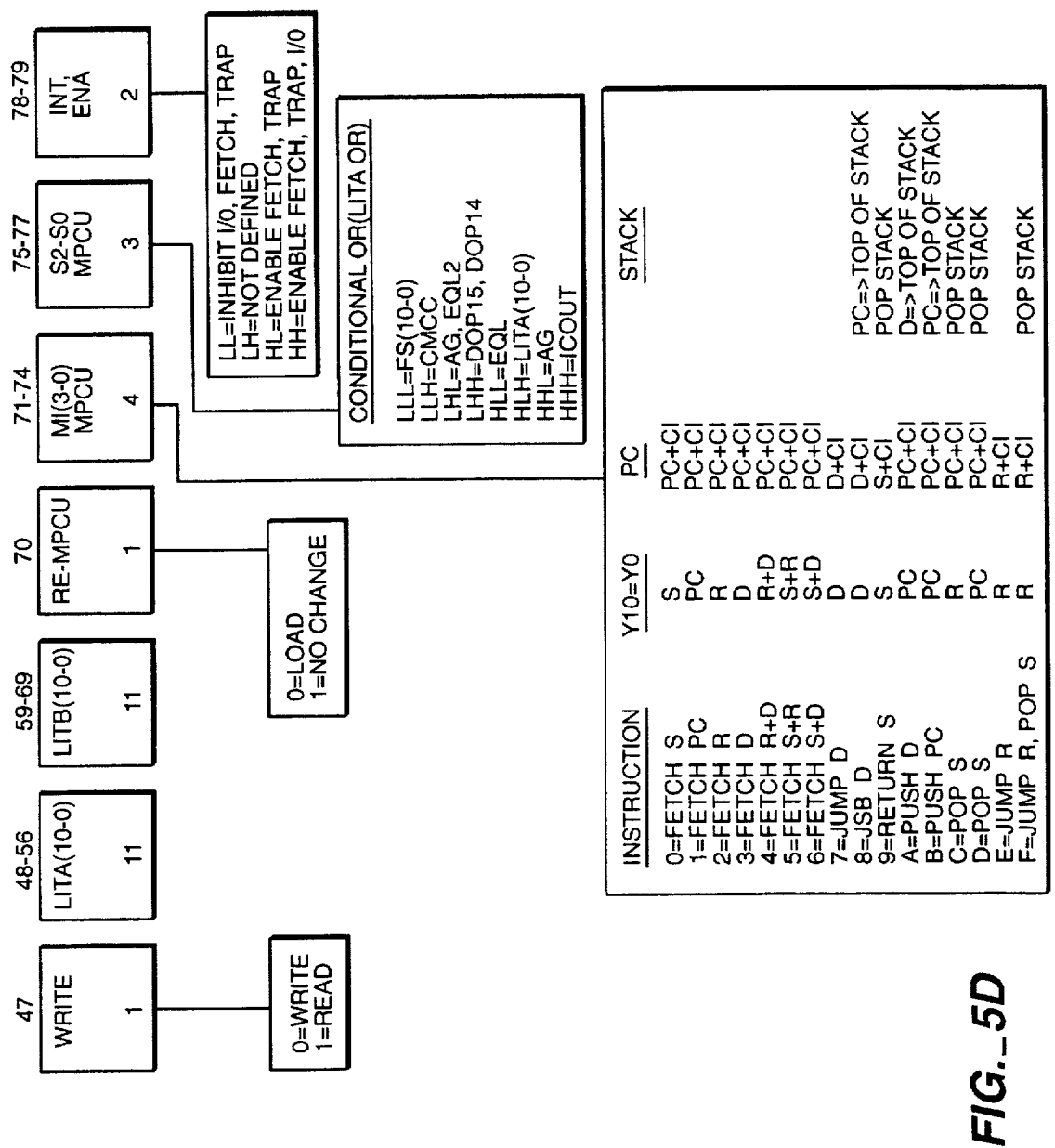
FIG._5D

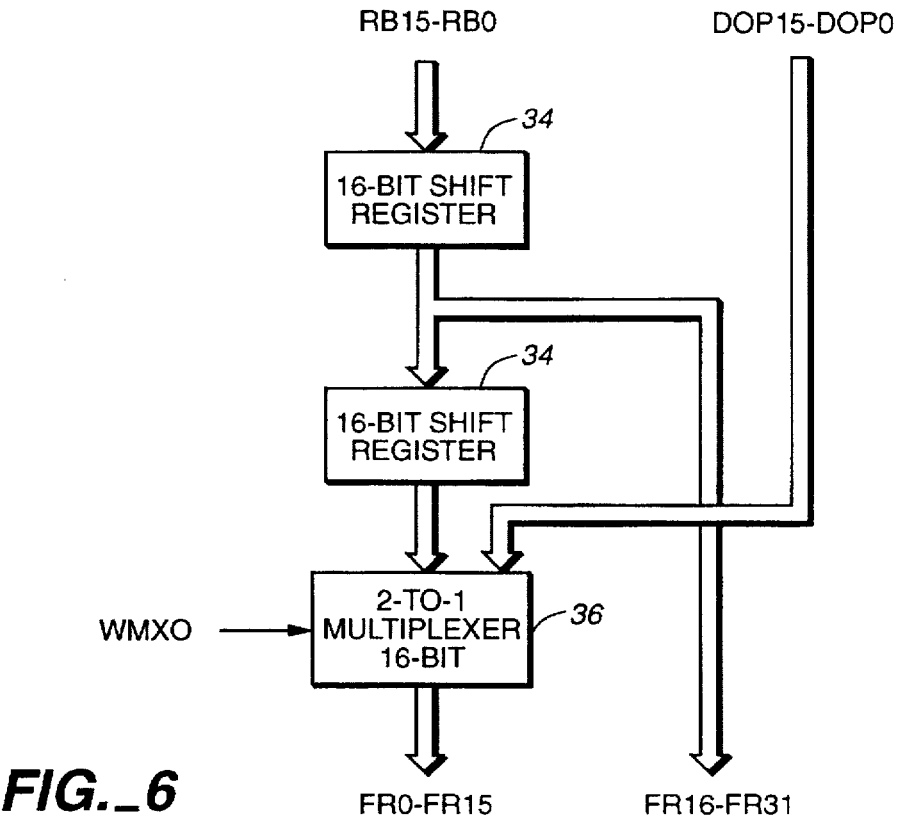

FIG._6

| TAG MEMORY | | | ROM MEMORY | | DATA TYPE |
|---|---|---|---|---|---|
| 7 6 | 5 4 3 | 2 1 0 | 15 14 | 13 12 11 10 9 8 7 6 5 4 3 2 1 0 | |
| 0 X | X X X | X X X | 0 0 | ADDRESS OF SCALAR | SCALAR |
| 1 X | ROWS,i | COLS,j | 0 1 | ADDRESS OF SCRATCHPAD MATRIX | ARRAY |
| 1 X | ROWS,m | COLS,n | 1 1 | ADDRESS OF MATRIX | ARRAY |
| 1 X | LENGTH l1 | | 0 0 | ADDRESS OF 1st ELEMENT | ARRAY |
| 1 X | LENGTH l2 | | 0 0 | ADDRESS OF 2nd ELEMENT | ARRAY |
| 1 X | LENGTH l3 | | 0 0 | ADDRESS OF 3rd ELEMENT | ARRAY |
| 1 X | LENGTH ln | | 0 0 | ADDRESS OF nth ELEMENT | ARRAY |

WHERE ELEMENT OF SCRATCHPAD MATRIX i x (TIMES) j ARE IN CONSECUTIVE MEMORY LOCATIONS.

WHERE ELEMENT OF MATRIX i x (TIMES) j ARE SUCH THAT
l1 ARE IN CONSECUTIVE MEMORY LOCATIONS
l2 ARE IN CONSECUTIVE MEMORY LOCATIONS
l3 ARE IN CONSECUTIVE MEMORY LOCATIONS
ln ARE IN CONSECUTIVE MEMORY LOCATIONS

WHERE X=DON'T CARE: l1+l2+l3-ln=m x(TIMES) n.

FIG._14

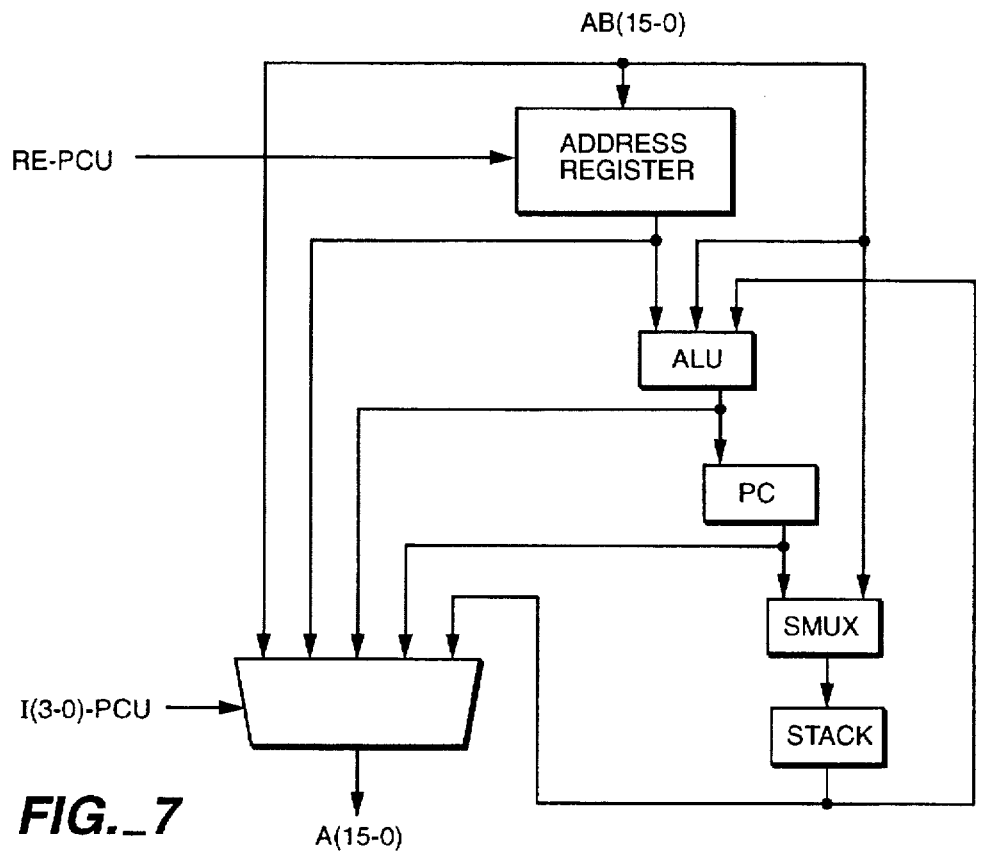
FIG._7
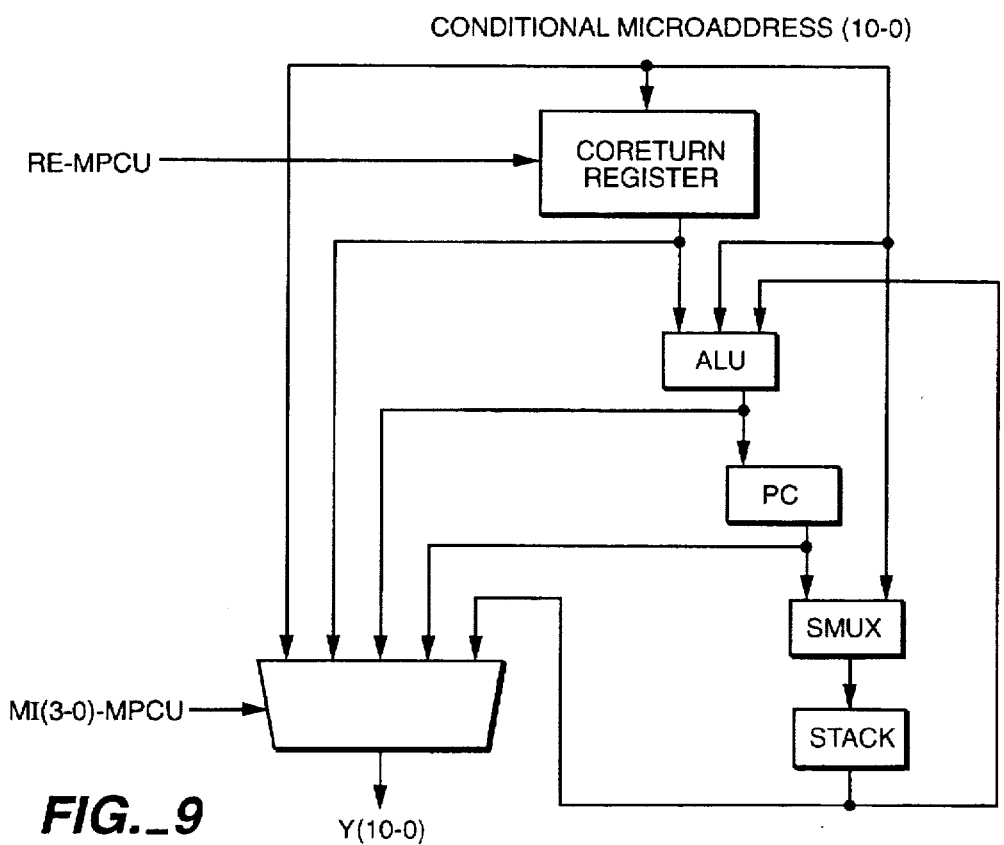
FIG._9

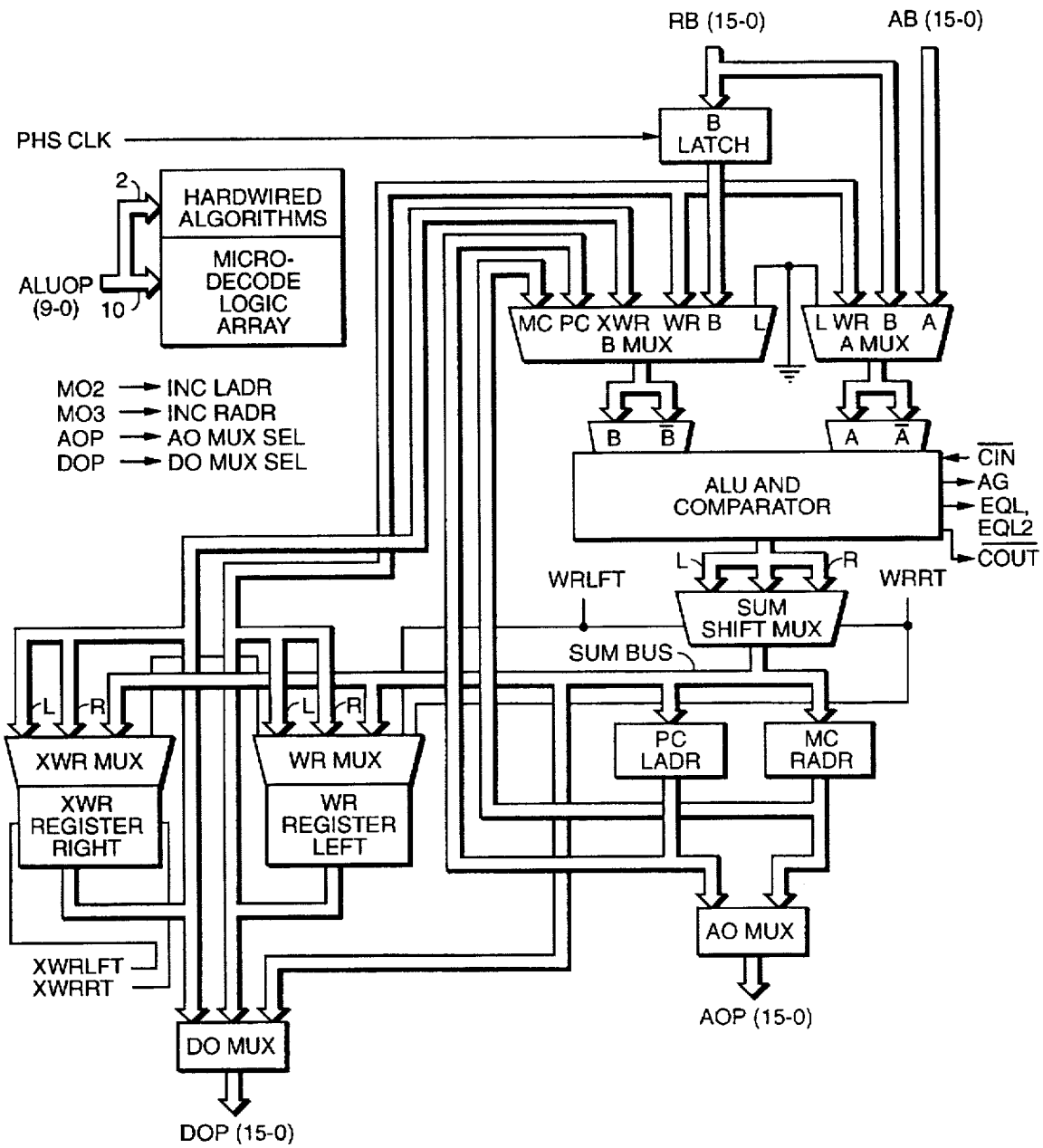
FIG._8

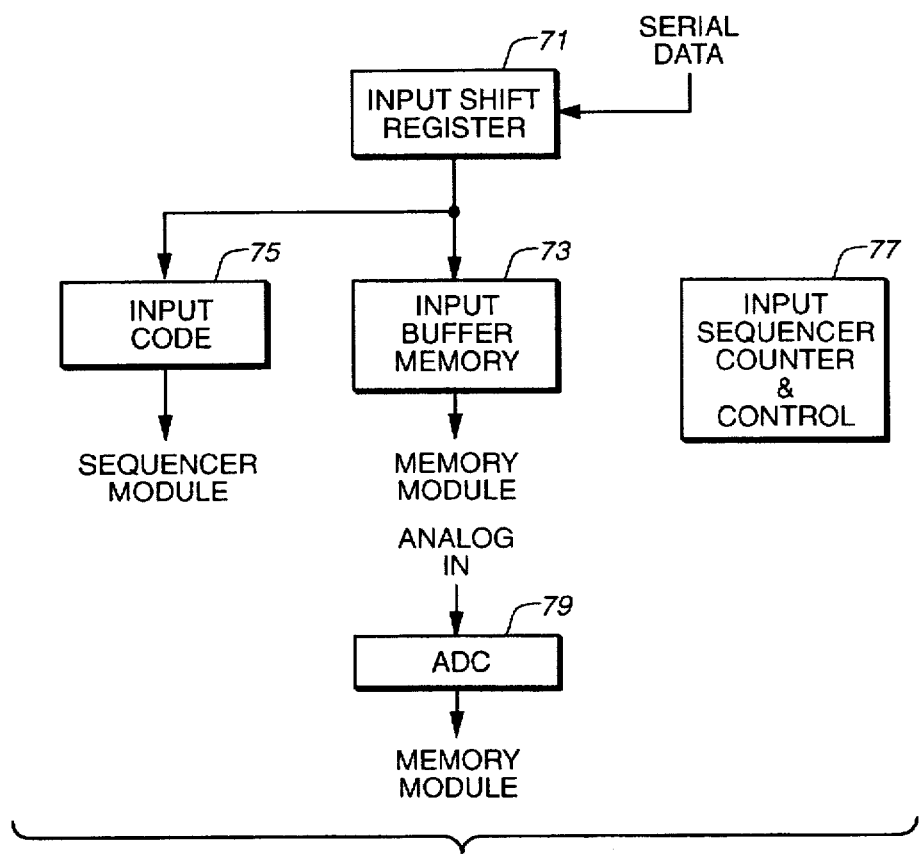
FIG._10
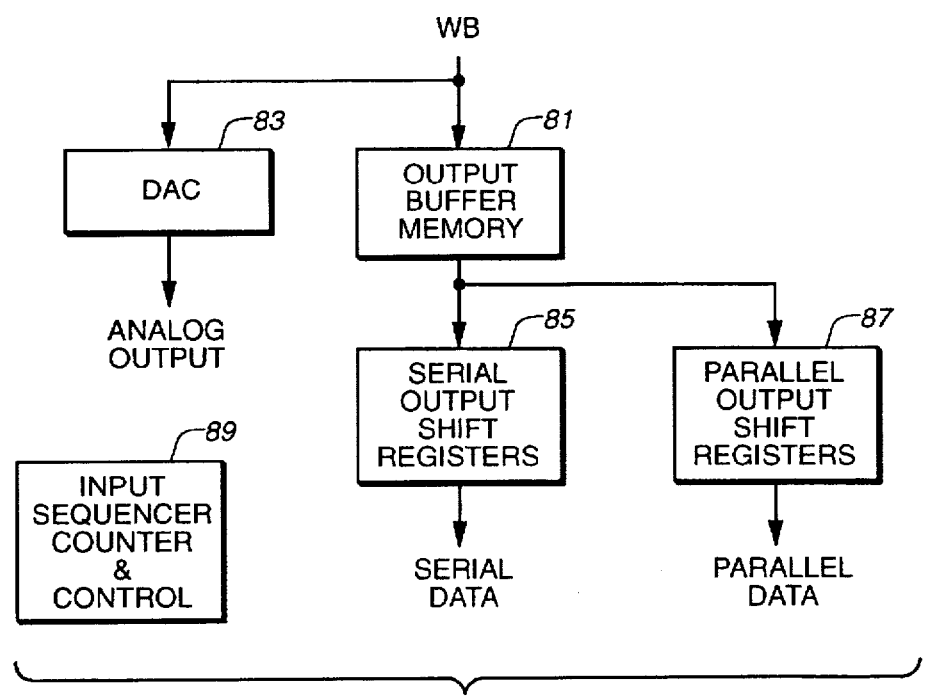
FIG._11

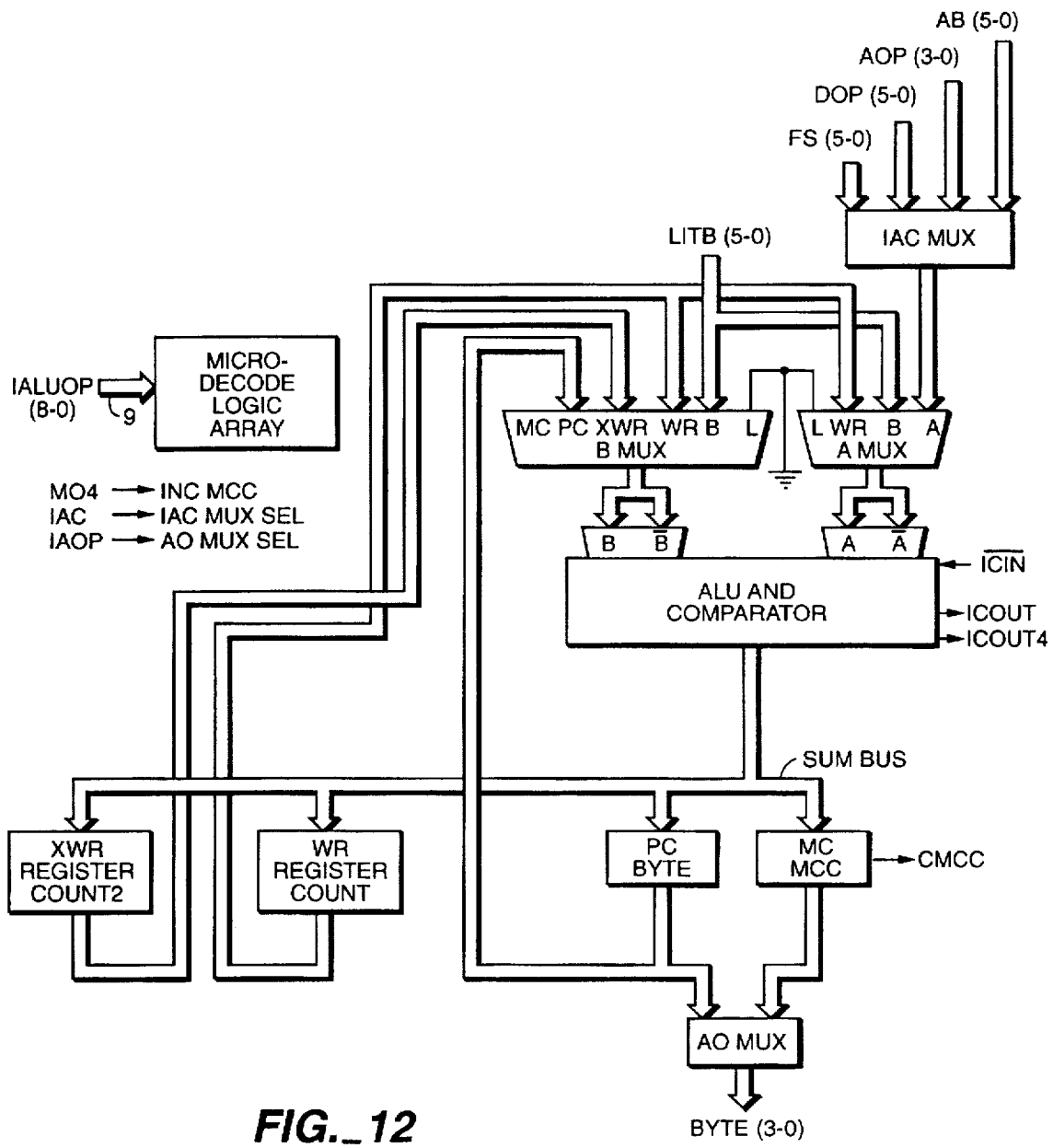
FIG._12

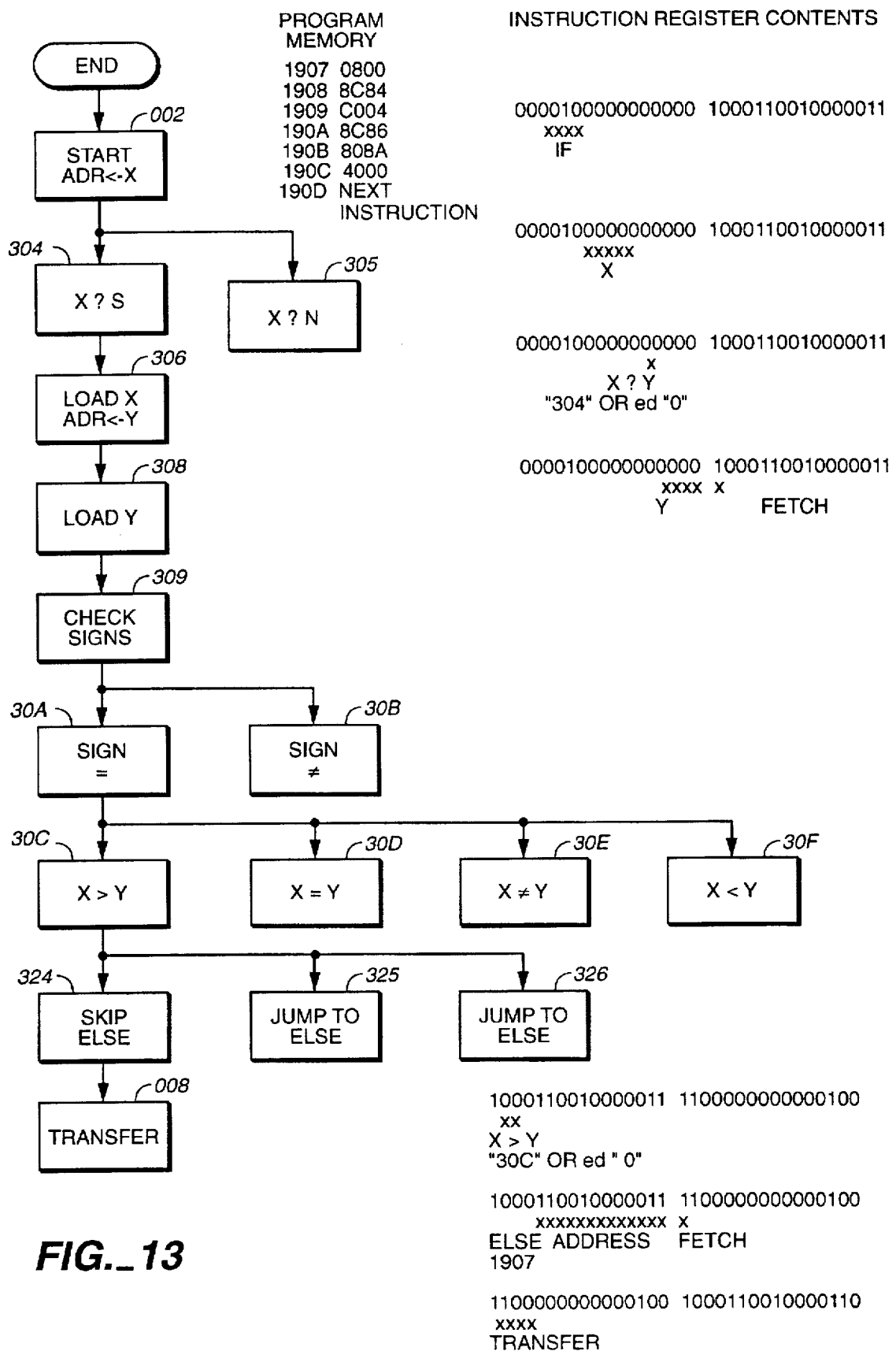
FIG._13

VARIABLE ARCHITECTURE COMPUTER WITH VECTOR PARALLEL PROCESSOR AND USING INSTRUCTIONS WITH VARIABLE LENGTH FIELDS

FIELD OF THE INVENTION

This invention relates to digital computers, and more particularly to an aerospace computer having a microprogrammed vector parallel processor using instructions with variable length fields for controlling the flight of a rocket.

BACKGROUND OF THE INVENTION

The concept of microprogramming was first introduced by M. V. Wilkes, "The Best Way to Design an Automatic Calculating Machine", Report of Manchester University Computer Inaugural Conference (July 1951), as a systematic way of designing the control section of a digital computer. His approach consists of providing the control section with an autonomous read only storage. Each time a program instruction begins, the control unit generates an address to its read only storage derived from the operation code (opcode) of the instruction. This location provides the first of a series of words which supply the control signals to the computer for carrying out the particular instruction being processed. Each instruction in effect generates a transfer to a microsubroutine associated with it, and the resultant step by step operation of the machine corresponds to the execution of a program on a very detailed level (thus the term microprogram).

These proposals were not widely implemented at the time of Wilkes' initial work in the early 1950's due to hardware limitations. However, the present availability of integrated circuit read only memories has made the construction of a microprogrammed computer feasible.

Additionally, a computer memory provides the largest hardware cost in a computer. Therefore, the key to hardware speed and minimum size lies in efficient use of the memory. Fixed instruction length computers require the same number of bits per each instruction word regardless of the simplicity or complexity of the operation to be executed. As an example, many bits can be wasted in instructions which specify simple operations, while many instructions can be wasted in complex operations where an instruction's capability is limited by its length.

Also, computers are designed according to one of three architectures: accumulative, list processor or general register. Except for special applications, the general register computer yields the most efficient use of memory. For most efficient operation it is desired to design a computer which can perform all applications most efficiently.

U.S. Pat. No. 4,099,229 discloses a variable architecture digital computer using a number of interlocking concepts resulting in an architecture more efficient than architectures currently employed. The general register concept provides a locality of data, the locality being referenced by a single address byte rather than a global address. With the register byte address mapped into a portion of the memory, the hardware registers do not need relevant program data, i.e., they are used for their ample processing capability for more sophisticated input/output mechanizations between instructions. Thus, input/output is memory oriented, relieving an instruction set for the computer of the need for input/output instructions. The input/output is, therefore, independently designed to meet the real-time needs and particular formats of the external interfaces independent of the instruction set.

The instruction set is of variable-length and is optimized to most efficiently solve the computational problem presented in two ways. First, the amount of information contained in an instruction is proportional to the complexity of the instruction with the shortest formats being given to the most frequently executed instructions to save execution time. Secondly, with a microprogram control mechanism and flexible instruction formatting, only instructions required by the particular computational application are provided by accessing appropriate microroutines, saving memory space as a result.

A read only microprogram memory with associated microinstruction register drives medium scale devices such as multiplexers and has a word wide enough to allow considerable parallel activity. A program memory provides variable-length instructions composed of strings of 4-bit bytes to an instruction register which can shift left in byte increments. A processor performs arithmetic or logical operations under control of the microroutine called by the opcode of the instruction, and uses general registers in a data memory as sources and destinations for operands referenced by the arithmetic or logical operations and also as index registers and memory pointers.

A sequencer provides for succeeding microprogram addresses under control of the microgram itself once a microprogram has been accessed by the opcode of an instruction. The input/output function is memory oriented and operated under the control of the microprogram on an interrupt basis at the conclusion of processing of an instruction.

For a specific missile real-time control application the computer receives serial digital attitude and time information for a guidance computer and rate gyro information from analog-to-digital (A-D) converters and provides serial digital data to a number of packages, parallel information to high rate packages and analog information to various servos.

The function of the flight control computer is to provide digital flight control for rockets launched from beneath the water. The invention was needed because of increasing system requirements, insufficient throughput margin of prior devices, and improvements in integrated circuit technology. An initial goal was to provide a flight control computer with twice the throughput of the prior art flight control computers. The problem can be summarized as follows:

a) The prior flight control computer could not provide the throughput for the new systems requirements.

b) Radiation hardened technology does not exist to increase parts speed to achieve twice the throughput.

c) Radiation hardened technology does not exist to increase the density and complexity of the microcircuits to achieve twice the throughput.

d) Use of two or three prior art computers to achieve the complexity to double the throughput would make the design impractical due to the volume and weight limitations within the missile guidelines.

e) Because the prior art language is fixed, clever programming techniques could not be applied to the prior art flight control computer to achieve twice the throughput.

f) The prior art flight program language and flight control computer treated all vector and array type parameters as scalar variables and had to perform calculations with do loops.

OBJECTIVES OF THE INVENTION

It is therefore a primary objective of the present invention to design a flight control computer with increased data throughput without increasing the size or power requirements of the system.

It is another objective to limit the use of hardware to radiation hardened materials.

SUMMARY OF THE INVENTION

These objects of the invention and other objects, features and advantages to become apparent as the specification progresses are accomplished by the invention according to which, briefly stated, a parallel architecture with two streams of commands is used with a new command structure. A new, more powerful instruction set was implemented to increase the throughput. Included in these new instructions are a series of block type moves which allow large amounts of data to be moved by loops within the microprogram instead of loops of firmware instructions which are fetched over and over again for each memory address. The new mechanization allows the firmware instruction fields to vary in length from 1 to 16 bits instead of the fixed 4 bit or 12 bit bytes found in the prior language. This change allowed the optimal use of memory.

LIST OF ADVANTAGES OF THE INVENTION

An important advantage of the present invention is that it provides twice the prior art throughput without doubling the number of pans or requiring the doubling of speed of the microcircuits.

Another advantage is that the volume remains small, the system remains radiation hardened and the system interfaces remain low-power Schottky types.

A further advantage is that implementation of ISL gate arrays has reduced power and size requirements.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 is a block diagram of the apparatus according to the invention.

FIG. 2 is a list of gate arrays of the computer of FIG. 1

FIG. 3 is a list of the program instruction set of the computer of FIG. 1

FIG. 4 is an illustration of coroutine execution for the computer of FIG. 1.

FIG. 5 consisting of FIGS. 5A, 5B, FIG. 5C consisting of 5C1, 5C2, 5D are together a table of microinstruction register bit assignments of the computer FIG. 1.

FIG. 6 is a block diagram of the instruction register of the computer of FIG. 1.

FIG. 7 is a block diagram of the program control unit of the computer of FIG. 1.

FIG. 8 is a block diagram of the arithmetic logic unit of the computer of FIG. 1.

FIG. 9 is a block diagram of the microprogram control unit of the computer of FIG. 1.

FIG. 10 is a block diagram of the input module of the computer of FIG. 1.

FIG. 11 is a block diagram of the output module of the computer of FIG. 1.

FIG. 12 is a block diagram of the index unit of the computer of FIG. 1.

FIG. 13 is an illustration of instruction execution by the computer of FIG. 1.

FIG. 14 is a table of memory tagged data types of the computer of FIG. 1.

Lexicon

ADC—analog to digital converters
ALU—arithmetic logic unit
CMX—control multiplexer
DAC—digital to analog converter
DOP—data output port
ROM—read only memory
R/W—read/write
WBX—write bus multiplexer

Glossary

The following is a glossary of elements and structural members as referenced and employed in the present invention.

20—microprogram module
22—microprogram memory
24—microinstruction register
30—instruction module
32—instruction register
34—16-bit shift registers
36—instruction multiplexer
38—field select unit
40—memory module
42—program read only memory (ROM)
44—read/write (R/W) data memory
46—tag read only memory (ROM)
47—address bus multiplexer
48—program control unit
50—processor module
52—arithmetic logic unit (ALU)
54—write bus multiplexer (WBX)
56—tag register
60—sequencer module
62—microprogram control unit
64—conditional microaddress multiplexer
66—priority logic
68—control multiplexer (CMX)
70—input module
71—16-bit input shift register
73—buffer read/write (R/W) memory
75—input address code register
77—input sequencer
79—analog to digital converters (ADC)
80—output module
81—output buffer memory
83—digital to analog converter (DAC)
85—output shift registers
87—alternate output buffer
89—output counter and control circuits
90—control module
92—index unit
94—microorder demultiplexer
96—system clock circuit

DESCRIPTION OF THE PREFERRED EMBODIMENT

The flight control computer according to the invention is a bit-sliced, microprogrammed based machine. The block diagram of the flight control computer according to the invention is shown in FIG. 1. The microprogram module 20 has a microprogram read-only memory (ROM) 22 and microinstruction register 24. When a microprogram word is addressed, the word is read from the microprogram ROM 22 into the microinstruction register 24. This register 24 supplies the control signals and literal fields which are used by the digital computer for a variety of addressing and indexing operations as well as for arithmetic operations. FIGS. 5A, 5B, 5C, 5D & 5E give the bit assignments for all the fields in the microinstruction register 24.

The instruction module 30 has an instruction register 32, instruction multiplexer 36, and a field select circuit 38 which can parse the instruction register in a pattern 1 to 16 bits wide, right justified. This parsing property accommodates variable length instructions which may be packed several instructions per word and may be split across the boundaries of adjacent words. The contents of the instruction register come from a user program. Separate instructions are accessed and their field format determined by a microprogram in the microprogram ROM, while the boundaries of the instruction words and the fetching of new words is kept track of by a byte counter.

The memory module 40 has memory which is divided into three sections. The user program resides in a program memory (ROM) 42. A read/write (R/W) data memory 44 contains space for input/output buffers, microprogram variables, workspace registers, and local subroutine variable storage. A tag memory ROM 46 contains the vector data information.

The processor module 50 has an arithmetic logic unit (ALU) 52 with local accumulator registers and unique counter/registers and can perform a variety of arithmetic and logic operations. Operands for the various operations are read by the microprogram from the program module 40 into the accumulator registers (which cannot be directly accessed by the user program) and are processed by the ALU 52. Results may be written back into the memory module 40. Memory addresses for the memory module 40 may come from the processor module 50 or the memory module 40. The unique tag register 56 and the write bus multiplexer 54 also reside in the processor module 50.

A sequencer module 60 controls access to the microprogram ROM 22 in the microprogram module 20. For a given macroinstruction (user program instruction) the first microprogram ROM address is determined from the opcode of the instruction word presently in the instruction register. Succeeding microprogram ROM addresses are under the control of the microprogram itself. This module also contains hardware to generate addresses for input/output (I/O) operations.

Data is acquired by the computer via an input module 70 for serial digital data, and via analog to digital converters for analog data to provide parallel digital data to the processor module 50. The input module 70 has an input register acting as a shift register which is filled serially, which operation is asynchronous with respect to the computer program execution. Input data is entered in parallel from the input shift register of the input module 70 directly in a local R/W memory buffer. From the local R/W memory buffer, the data is entered into the data memory of the memory module 40 on an interrupt basis at the completion of an instruction execution of the user program. The input analog data is converted to digital data on demand by the user program instruction and transferred directly into an allocated position in the data memory of the memory module 40.

Output data from the output module 80 may be in three forms. Data to missile servos is converted from digital to analog by a digital-to-analog converter (DAC). A serial digital output is obtained by converting from parallel to serial by output shift registers. The third form of data is kept in parallel for high rate requirements and is transmitted via a buffering register. The allocation of output buffers in the data memory of the memory module 40 is made in the microprogram and is restricted to a particular area in the data memory.

The control module 90 contains hardware to perform several distinct and unrelated functions. The index unit 92 contains a byte counter which is used in the decoding of the instruction register. Other counters are present in the index unit which are used in microprogram execution and the transfer of data from the input module 70 to locations in the data memory of the memory module 40. Other circuits such as demultiplexer 94 decode a microorder control field in the microprogram instruction to provide infrequently used, mutually exclusive, control signals to the computer. A system clock circuit 96 also resides there.

Referring now to the FIGS. 5A to 12, a detailed description of a specific embodiment is described. The microprogram module 20 has a read only memory (ROM) 22 with 2048 80-bit words, the output of which is loaded into a microinstruction register 24, and provides internal control signals for the computer. As shown in FIGS. 5A, 5B, 5C, 5D & 5E, the microinstruction register 24 may be divided into functional fields, with each field corresponding to a specific control function. Each microinstruction is encoded only to a level where it can drive LSI gate arrays and medium scale devices such as multiplexers, consequently it is wide enough (80-bits) to allow considerable parallel operation.

Fourteen bits of the microinstruction register 24 form the multiplexer control fields and are broken down into 2-3 bit fields, 3-2 bit fields, and 2-1 bit fields- AMX, S2-S0 MPCU, DOMX, WMX, IAC, AOP, and IAOP. Each of these fields supplies an address to a single multiplexer. These multiplexers will be discussed in detail in the circuit in which they appear.

The remainder of the microinstruction register 24 is comprised of several fields whose functions will now be summarized and will be discussed in greater detail along with the computer module in which they are used. From FIGS. 5A, 5B, 5C, 5D & 5E the microorder control field MPMO(4-0) supplies addresses to the demultiplexer in the control module 90 and there by controls various microoperations within the computer. The RE-PCU causes the loading of the address register in the program control unit 48. The 1(3-0)-PCU field tells the program control unit 48 which of the 16 operations to perform on the operands supplied to it. The DPCIN,DPCOUT are used to control the carries of the ALU 52 in double precision operations. The CIN signal provides a carry into the least significant bit of the ALU 52. The ALUOP(0-9) field tells the ALU 52 what operations to perform on the operands supplied to it. The ICIN signal provides a carry into the least significant bit of the index unit 92. The IALUOP(0-8) field tells the index unit 92 what operations to perform on the operands supplied to it. The CLKSEL(2-1) field adjusts the rate of the system clock 96 to 200, 300, 400, or 500 nsec periods per microroutine, so that operations which encounter extensive logic delays within the computer may be used. The WRITE signal allows the contents of the write bus multiplexer 54 (WBX) to be stored in the data memory 44 at the address specified by the program control unit 48. The LITA (10-0) field supplies a literal which may be used by various parts of the computer in operations such as microprogram address modification. The LITB(10-0) field supplies a literal which may be used by various parts of the computer in operations such as memory module address modification. The RE-MPCU causes the loading of the unique COROUTINE register in the microprogram control unit 62. The MI(3-0) MPCU field tells the microprogram control unit 62 which of the 16 operations to perform on the operands supplied to it. The INT, ENA field enables the microaddress to be switched to the priority logic 66 if an I/O condition exists.

Referring now to FIG. 6, the instruction module 30 has two 16-bit shift registers 34 which load an instruction in parallel. The inputs to the most significant shift register are the outputs from the least significant shift register. The inputs to the least significant shift register are from a user program instruction from the memory module 40. Once loaded the instruction shift registers 34 are considered as one 32-bit register. The equivalent number of shifts in the instruction register is determined by the byte counter (BYTE) from the index unit 92 which keeps track or points to the next unused bit of the instruction shift register 34 by pseudo shifting or counting the number of empty bits, i.e. bits already used of information supplied by the user program. By this pseudo shifting continuously and loading in this manner the instruction shift register 34 supplies an apparently endless string of bits to the microprogram.

The instruction in the instruction register 34 is broken down into its component field (opcode, address, indexed variable, etc.) by analyzing the high order bits in the register, then incrementing the byte counter so that it points to the next unused field in the register. Each field may be isolated and read out from the instruction register 34 through the instruction multiplexer 36 and field select unit 38 and is determined by the byte counter and the 4 least significant bits of the LITB field of the microinstruction register 24. The other input to the instruction multiplexer 36 is from the 16-bit data out port (DOP) of the arithmetic logic unit (ALU) 52. The particular input to the field select unit 38 from the instruction multiplexer 36 is determined by the WMXO bit from the microinstruction register 24. The output of the field select unit 38 is connected to the input of the address bus multiplexer 47, index unit 92, and the conditional microaddress multiplexer 64.

FIG. 1 shows the memory module 40 which has a program memory 42 (read only memory) in which the user program is stored, a data memory 44 (read/write memory) which contains the workspace, microprogram variables, local user operand subroutine storage, and input/output storage, and the TAG memory (ROM) 46 containing the operand vector information. The program memory 42 is the source of user program instructions for the instruction module 30, and data memory 44 is the source of data for the ALU 52 as well as data for output via the write bus multiplexer 54. A write signal from the microinstruction register 24 enables the date memory 44 to receive data from the write bus multiplexer bus 54 (WBX).

An address bus multiplexer 47 is controlled by the AMX field of the microinstruction register 24 and connects directly to the program control unit 48. The program control unit, FIG. 7, is typical of those found in any computer although its local instruction set has been optimized for this application. The opcode bit patterns, from the microinstruction register 24 providing 16 different options, are defined in FIGS. 5A, 5B, 5C, 5D & 5E. The RE PCU bit of the microinstruction register 24 controls when the address register, REG register, FIG. 7 is loaded. The output of the address bus multiplexer 47 also connects to the input of the arithmetic logic unit 52. A 14-bit address field is required for a total memory of 16384 words.

Again looking at the processor module 50 in FIG. 1 the arithmetic logic unit (ALU) 52, FIG. 8, can perform a large number of operations using two operands. These operations include addition, subtraction, left and right shifting, incrementing, decrementing, logical ANDing and ORing, and a hardware multiply routine. In this case OP8 and OP9 field of the ALU 52 become outputs and control the operation of the unit. The particular operations are chosen by the OP0–OP9 fields of the microinstruction register 24 and are defined in FIGS. 5A, 5B, 5C, 5D & 5E. The two operands can come from any of the four internal registers, LEFT, RIGHT, LADR, and RADR, and the address bus multiplexer 47 or the read bus from the memory module 40.

The write bus multiplexer 54 (WBX) selects the source of all input to the data memory 44, as well as making the selected data available to the output module 80, depending upon the WMX field of the microinstruction register 24. The inputs are (1) DOP from the ALU 52, (2) A, the output of the program control unit 48, (3) RB, the output of the memory module 40, and (4) CM, the output of the control multiplexer 68. The selected data is written into the area of the data memory 44 presently addressed by the program control unit 48 if the WRITE signal is present. The TAG register 56 is also found in the processor module 50. It is 8-bits wide and its outputs are tri-stated with the WBX 54 under control of the microorder field MPMO(4-0) found in the microinstruction register 24.

Referring now to FIG. 9, the microprogram control unit 62 contains the logic that controls microinstruction address sequencing. The microprogram control unit is a standard part except for the use of the unique CORETURN register. It is controlled by the microinstruction register 24 according to the bit pattern MI(3-0) MPCU defined in FIGS. 5A, 5B, 5C, 5D & 5E. There are various sources of microaddressing for executing microprogram instructions and microprogram I/O routines. Microprogram ROM 22 addresses are output from the microprogram control unit 62, through the control multiplexer 68 (CMX). This control multiplexer 68 is the only multiplexer in the computer whose input select signal, CMXO, is derived in part from external I/O conditions. The selection of the CMXO signal is generated by the microprogram in conjunction with the priority logic 66. The input to the control multiplexer 68 is from various sources within the microprogram control unit 62 when the computer is executing a user program. When an I/O interrupt is processed, the beginning address of the microprogram I/O routing is provided by the priority logic 66. The address for an interrupted microprogram is saved in the stack of the microprogram control unit 62 pending resumption of the interrupted program.

As the instruction register 34 of the instruction module 30 is emptied, program execution must be temporarily suspended at some time while a new instruction is "fetched" from the program memory 42. This is done by selecting the I/O channel of the control multiplexer 68 for one instruction cycle which results in a hardwired branch to a location in the microprogram ROM 22 containing a routine for fetching a word from the program memory 42 and placing it in the least significant register of the instruction register 34. No internal registers are used in this microroutine so that program execution may be resumed after the fetch cycle is complete.

Another I/O input to the control multiplexer 68 is provided by a status word which is part of the data input to the input module 70. The status word appears periodically and creates a real-time jammed interrupt to start the user program. This word specifies one of a plurality of microdiagnostic programs which runs just prior to the main program and supplies a hardware test result to the output module 80. At the time of this interrupt, the microprogram module 20, the instruction module 30, the processor module 50, the sequencer module 60, and the index unit 92 are devoid of information relevant to the program state, this information existing entirely in the memory module 40. Thus these modules are available for fault testing with the microdiagnostic routines. Since the memory oriented architecture implies that these modules are also responsible for the logical function of much of the I/O processing, (in a time sharing sense), a great deal of information is available which would otherwise be unobtainable during actual computational processing i.e., during a missile flight, for example. A key feature of the microdiagnostic routines is that they are executed in real-time while a mission is in progress, thus providing logical fault data about the computer while in flight.

The outputs of the conditional microaddress multiplexer 64 are selected by the S2-S0 MPCU field of the microinstruction register 24. the inputs are: (1) the FS(10-0) signals from the field select unit 38, (2) the CMCC signal from the index unit 92, (3) the AG.EQL2 (same as the EQL signal) signals from the ALU 52, (4) The DOP15,DOP14 signals from the ALU 52, (5) the EQL signal from the ALU 52, (6) the LITA(10-0) field from the microinstruction register 24, (7) the AG signal from the ALU 52, and (8) the ICOUT signal from the index unit 92. These signals are ORed with the appropriate least significant bits of the LITA(10-0) field to provide an 11 bit input to the microprogram control unit 62.

Entering and leaving microsubroutines are standard operations within the microprogram control unit 62, see FIG. 9. On a microprogram call, the present address+1 in the program counter (pc) is stored or pushed onto the stack as the return address and the calling address+1 is stored in the program counter. On a microprogram return, the return address is popped from the stack and the return address+1 is stored in the program counter.

The input module 70 is shown in FIG. 10 and is composed of a 16-bit input shift register 71 and a buffer R/W memory 73. Input is received serially and is shifted in until the register 71 is full, at which point the register is loaded into the buffer memory 73. Once data transmission is terminated, an input interrupt is generated by an input sequencer 77 and sent to the sequencer module 60. An input address code register 75 indicates what kind of data has been received. This information is used by the sequencer module 60 to generate the microaddress of an input handling routine. The input data is in 16-bit words and is placed in successive buffer locations of the 512 word by 16-bit input buffer memory 73. The microprogram routines designate the address in the data memory 44 where the information from the input buffer memory 73 is to go. The user program uses this information before the next set of similar input data is received. If the input data word is a microdiagnostic word, a portion of a data memory location is used to select the microaddress of the particular one of a plurality of microdiagnostics specified.

The output module 80 is shown in FIG. 11. The output buffer memory 81 and its associated output shift registers 85 are under control of output counter and control circuits 89 which controls the loading of the output shift registers 85 from the output buffer memory 81 and the serial unloading of the output shift registers. The output counter and control circuits 89 are in turn controlled by the MPMO(4-0) field of the microinstruction register 24 via the control module 90. The serial outputs are connected through output logic circuits 85 under control of the output counter and control circuits 89 to several different lines to provide serial digital outputs. The output logic circuits 89 also provides the microprogram module 20 with an output interrupt signal to indicate the output buffer memory 81 is ready for the next output interrupt.

An alternate output buffer 87 is loaded by a signal from the control circuits 89 and is connected to provide a parallel digital output for high rate devices. A digital to analog converter (DAC) 83 under the control of the MPMO(4-0) field receives its input from the write bus multiplexer 54 of the processor module 50 and provide an analog output to drive analog devices.

Returning now to FIG. 1, a priority sub-module located in the sequencer module 60 has a priority logic circuit 66. The priority logic circuit 66 receives the interrupt inputs, (FETCH) index unit, (INPUT) input module, (OUTPUT) output module, (PFI)input module, (JAM-OFF) output module, (STATUS) input module, (TRAP) memory module, and (INPUT ERROR) input module and determines whether the computer should be executing an instruction, fetching an instruction, or processing an interrupt. When more than one of these conditions is pending, the action taken is determined by the priority logic circuit 66.

Whenever a new instruction must be fetched from program memory 42 of the memory module 40, controlled by the bits INT, ENA of the current microinstruction register, the "fetch" condition is detected at the end of the current microinstruction. Then the addressing portion of the fetch takes place through the priority logic circuit 66 and takes place before the next microinstruction is executed.

INT, ENA also may indicate a condition called END which is used to determine when the computer may be interrupted. When a user program instruction is begun, the computer enters the microprogram segment associated with that particular instruction. In most cases this segment will make use of registers in the ALU 52 and counters in the index unit 92 for local bookkeeping operations. This data is discarded at the end of the segment, and the next program instruction may use the local registers and counters for different set of data. To prevent data in the local registers and counters from being lost, the interrupt subroutine of the microprogram can interrupt the processor module 50 and index unit 92 only when the END condition occurs. The last microinstruction associated with each macroinstruction (program instruction) contains such an END condition so the pending interrupt may be acted upon when instruction processing is complete. Under these circumstances an interrupt address is generated by the priority logic circuit 66 and is selected through the sequencer module 60.

The last module to be described is the control module 90, see FIG. 1, which contains the hardware to perform several distinct functions. The hardware functions are scattered over the computer to reduce parts count and interconnect. A microorder demultiplexer 94 outputs a number of signals which enable various conditions within the computer. These signals are produced by the MPMO(4-0) field of the microinstruction register 24 since they are used less frequently than the signals which are assigned their own unique control fields in the microinstruction register. They do not have to be explicitly specified for each microinstruction and no two of them must be activated at the same time, thus saving several bits in each microinstruction, i.e. instead of 32 bits for 32 signals, only 5 bits are required. The signals from the MPMO(4-0) field include A/D control, D/A control, incrementing various counter, enabling several multiplexers, and several other functions. They are divided into two classes, clocked and unclocked.

The unclocked signals, when selected, become active as soon as demultiplexer decoding of the MPMO(4-0) field is complete and remain so until the next clock pulse places a new microinstruction into the microinstruction register 24. These signals drive circuity which is itself clocked, such as counters or registers, and thus any decoding spikes from the microorder demultiplexer 94 have no effect and are assumed to have settled out before the next clock pulse. Conversely, clocked signals drive register devices directly. Since decoding spikes are undesirable in this case, as they might cause errors, they are avoided by clocking the microorder demultiplexer enable line. Clocked signals are thus active only during the clock pulse following the one in which they were loaded into the microinstruction register 24.

The index unit 92, see FIG. 12, contains a multiple cycle counter and two other counters, COUNT AND COUNT2, which allow control of cyclic processes such as multiplying and shifting, counting through the number of rows and columns of arrays, and transfer of data from the input buffer memory 73 to the data memory 44. They are loaded from the LITB(5-0) field of the microinstruction register 24 or other sources. The control of these functions is from the 8-bit IOP(8-0) field of the microinstruction register 24. End of process is indicated when a carry out, ICOUT or CMCC, of the counters is detected and a conditional transfer is made on the basis of the condition.

A byte counter within the index unit 92 and associated interrupt control logic are used in the loading of the instruction register 34. The byte counter is loaded from the four least significant bits of the LITB field. Output of the byte counter goes to the field select unit 38 and the address bus multiplexer 47. Whenever the carry out of the byte counter indicates all 16-bits of the most significant instruction register 34 are used up, the FETCH signal becomes active. This signal is processed by the priority logic 66 in conjunction with the INT, ENA field of the microinstruction register 24. When the INT, ENA field indicates a FETCH enabling condition in conjunction with the FETCH signal and the absence of a higher priority interrupt, the interrupt control logic generates a microaddress which is selected by the control multiplexer 68 and causes the computer to enter a FETCH processing microroutine.

The instruction set for the computer is organized around variable bit length fields where the program memory words are several fields long. The number of fields used in a given instruction is dependent on the amount of information required and is fixed by the microprogram associated with that instruction. Length may be as short as a 1-bit field or of an infinite length for an arithmetic string depending on the complexity of the arithmetic expression involved.

The variable length field scheme allows memory space to be conserved by using the minimum number of bits required for each instruction rather than multiples of a fixed word length. If an instruction occupies less than a full computer word, the following instruction will begin in the first unused bit of the word and, if necessary, continue into the next word. Since the computer is word-addressable rather than bit-addressable in order to minimize the size of instruction fields, it is not possible to transfer program control via a branch instruction to an instruction which begins in the middle of a word. This condition is remedied by the SKIP instruction or by the insertion or filling of binary 0 bits until the instruction to be transferred to begins in the first bit of a word, the insertions being accomplished automatically by a program compiler.

The actual field formats of each instruction, excluding the opcode (which is used directly as an address to the microprogram ROM 22 and thus must appear at the beginning of an instruction), are determined entirely by the microprogram, making the number and placement of the fields entirely arbitrary.

Since a single 4-bit field is used as a opcode, the number of basic opcodes is fixed by the hardware at sixteen. However under microprogram control additional fields (called variant fields) may be used to modify the opcode and thus extend the instruction set. In the general case the variant operations of a single opcode need not be related at all, and thus no flexibility is lost in the possible instruction set by restricting the number of basic opcodes to sixteen.

The sixteen basic types of instructions can be subdivided into several classes. Three instructions allow data transfers between memory locations. All arithmetic operations derive their operands from a five bit field which is added to a base address to form a full 14-bit address. Thus an appreciable storage saving in the cases of arithmetic expressions is accomplished. The polish string instruction allows a sequence of operations of indeterminate length to be performed using the contents of the memory. Any arithmetic expression that can be expressed as a chain calculation is valid. Intermediate results are saved in the workspace in data memory 44.

Arithmetic operations, such as addition, subtraction, multiplication, incrementing, decrementing, etc., shifting operations, and logical operations such as ANDing and ORing of two words are available. Various types of index data transfers are available. Also several types of branching operations are available, including both unconditional and conditional branching (IF instructions) as well as subroutine branch and return operations.

Subroutine branching is slightly different than what is ordinarily considered. In a subroutine call, two words are pushed onto the stack, the calling routine's return address, and the calling subroutine's base address which points to the first of from 1–32 operands per subroutine. A program compiler inserts two addresses into the CALL instruction. First is the address of the called subroutine and second is the base address of the called subroutine. If more than 32 operands are required within a subroutine, a new set of up to 32 operands is chosen using the DECLARE instruction which inserts a new base address on the stack pushing the old one down into the stack. This new base is removed from the stack by the POP instruction before a return is encountered. The RETURN instruction pops the called subroutine's base address off the stack and the return address to the calling routine, leaving the original base address of the calling routine on top of the stack.

Microprogram execution of instructions will be illustrated by reference to the IF instruction. Referring now to FIG. 13, it is desired to set Z to the larger of X and Y, where X, Y, and Z specify memory locations, or IF X>Y, THEN Z=X, ELSE Z=Y. The assembled instruction could appear in program memory 42 as a string of hexadecimal characters as illustrated. The abbreviated flow chart of the implementing microprogram is shown at the left and the consequent instruction register activity is shown at the right. The boxes in the flow chart represent microinstructions where the microaddress in hexadecimal is shown above each box.

The END instruction is responsible for incrementing the BYTE counter in the index unit 92 and starting the next instruction. This is done by ORing the LITA field '000' with the most significant unused field of the instruction register 32. When an instruction is ending, the terminating microinstruction's LITA field is always '000'; therefore the OR of this LITA and the opcode is always the opcode. This forces a branch to one of the first 16 locations in the microprogram which contains the first step for that instruction. The IF will actually start with its 4-bit opcode 2 shifted out and the 5-bit indexed field for X will be the next unused field of the instruction register. The microinstruction stores the 5-bit index field in the address register of the PCU 48. The next unused 1 bit field is a 0 which means the value in memory location X is compared to the value in memory location Y. If the field were a 1, it would mean the value in memory location X would be compared to the value Y. In this case the LITA field '304' is ORed with the bit '0' to yield the microaddress '304'. Again the byte counter is incremented by 1 and the 5-bit index field of Y is the next unused field in the instruction register. The next microinstruction adds the address register to the base address of the user program subroutine and a memory cycle begins, placing the actual number X in the LEFT register. At the same time, the 5-bit index field for Y is stored in the address register. Again the byte counter is incremented by 5 and a fetch occurs in this case. Then the address register is added to the base address of the user program subroutine and another memory cycle begins, placing the actual number Y in the RIGHT register. This sequence is typical to all instruction which use two operands.

At this point, the 2-bit field in the instruction register specifies what kind of comparison is to take place- greater than, equal, unequal, or less than. This is accomplished by ORing the 2-bit field '00' for greater than with the LITA '30C' resulting in the microaddress '30C'. For the purpose of this example assume X is indeed greater than Y. Since the greater than comparison test is done at '30C' and since it is true by assumption, a direct GOTO the ELSE condition is skipped by adding 14 to the BYTE counter. Again a fetch occurs. The next field it sees is the 4-bit opcode field 8 which is the opcode calling for the contents of one memory location X to be moved to another memory location Z. A GOTO the next instruction skipping the ELSE condition is found after the memory transfer. The remainder of the microprogram sequence is not shown, however a skip instruction follows the ELSE condition because the next instruction opcode is found at the word boundary of the next memory location 190D.

A detailed description of the vector string instruction will follow. It can be formed by two different types of tagged data, matrix or scalar, as shown in FIG. 14. The TAG register 56, an 8-bit register, is loaded with the tag bit, three bits for the number of rows, and three bits for the number of columns from the data string instruction. The position of the TAG register is shown in FIG. 1. The CORETURN register, an 11 bit register, which contains the coreturn address to the microprogram memory, is loaded during the coroutine microinstruction sequencing and is found in the micropro-gram control unit 62. The register/counters, LADR and RADR, which are 16 bits wide, are contained in the arithmetic unit 52. The LADR register/counter points to the left vector operand address and the RADR register/counter points to the right vector operand address. As the instruction proceeds the left operand address is loaded in the LADR register. Since the operand is considered an array or vector, the elements are found in consecutive addresses of memory. A memory workspace address in the data memory 44 is loaded in the LADR register/counter. The left operand address is transferred to the RADR register/counter. The left operand vector or array is then transferred down to the workspace memory where all partial results of a string instruction are also stored so the original values of the left operand are not destroyed. Once the left operand vector values are in the workspace memory, the trap-coroutine structure is initiated. The right operand address is then loaded into the RADR register/counter. The value of the first element of the left operand is loaded into the left accumulator from the workspace and then a trap to a coroutine occurs to get the value of the right operand. The coreturn address is loaded into the unique CORETURN register in the microprogram control unit 62 at that time. The right operand value is loaded into the right accumulator using the address provided in the RADR register/counter. The coroutine returns to the main microinstruction sequence while the counter part of the RADR register/counter is incremented. The required operation is performed on the left and right values of the first elements of the array or vector and the result is stored in the left accumulator. This value is then transferred from the left accumulator to the workspace using the address in the LADR register/counter which is incremented to get the next left operand value from the workspace. The counter implementation of the LADR and RADR register/counters is used because it is faster and the arithmetic unit is not tied up doing a simple increment. The values of rows and columns in the TAG register are loaded into the general-purpose counters COUNT and COUNT2 found in the index unit 92 which allow the microprogram sequencing through the arrays or vectors to terminate when all the elements have been operated on. When the store or finish operator is encountered in the string, the last operand will provide the first address of the target vector or array where the results in the workspace will be stored. The beginning workspace address is loaded into the LADR register/counter and the first target address is loaded into the RADR register/counter. The finish portion of the string sequence is started and the data is loaded from the workspace through the left accumulator to the target or data memory 44. Again the counter part of the register/counters allows the address incrementation without using the arithmetic unit resources.

Then, the present invention provides a variable architecture vector digital computer where the most complex design features are concentrated by special unique hardware implementation to give instruction content to vectored data and in the microprogram which, along with this unique hardware, controls the instruction set, input/output and diagnostic tests. Developmental changes in the software, thus, do not affect the hardware, and the variable instruction length provides maximum flexibility with minimum memory space which is so important in aerospace applications.

This invention is not limited to the preferred embodiment and alternatives heretofore described, to which variations and improvements may be made, without departing from the scope of protection of the present patent and true spirit of the invention, the characteristics of which are summarized in the following claims.

We claim:

1. A variable architecture digital computer comprising:
   a microprogram module containing a plurality of microprogram routines including a microprogrammed vector string routine;
   an instruction module having an instruction register divided into a plurality of fields in excess of a number of bits of an instruction word, said instruction module providing means for parsing words in fields under control of said microprogram routines;
   means for processing data to indicate a vector operand, a scalar operand, said means for processing data including a tag register to hold dimensional operand vector information under control of said microprogram routines;

a memory module having a memory divided into a program memory, a data memory, and a tag memory, said program memory being a source of instruction words and said tag memory being a source of said operand vector information being addressed by a program control unit whose inputs are from an address multiplexer;

a processor module means for performing operations on data from said data and program memories and said instruction register, said processor module including special register counters to provide means for performing vector operations under control of said microprogram routines;

means for inputting and means for outputting a variety of data to and from said data memory under control of said microprogram module; and means for controlling operation of each element of said computer under control of said microprogram module.

2. A computer as recited in claim 1 wherein said microprogram module includes:

a read-only memory in which said microprogram routines are contained, microinstructions of said microprogram routines being addressed by a means for sequencing; and a microprogram register to which a particular microinstruction of a microprogram routine being executed is transferred from said read-only memory, said microprogram register having outputs to all modules of said computer to drive gate arrays and medium scale devices in each of said modules.

3. A computer as recited in claim 2 wherein said instruction register of said instruction module is, in an input mode, in the form of two parallel registers whose input to a least significant register is from said memory module and whose input to a most significant register is from said least significant register and, when in an output mode, is in the form of one register.

4. A computer as recited in claim 3 wherein said instruction module includes:

a field select unit under control of a byte counter and a field from said microinstruction register which selects under control of said microprogram a next unused field in said instruction register, said field being right justified by said field select unit.

5. A computer as recited in claim 4 wherein said processor module includes:

an arithmetic logic unit which performs arithmetic and logical functions upon two operands from a variety of sources, stores results in one of a variety of targets, contains said two special register counters for said vector operations, a particular function to be performed being determined by a particular microinstruction in said microinstruction register;

a write multiplexer which has inputs from said means for inputting, from said arithmetic logic unit, from said program control unit, from said memory module, and from a control multiplexer, and provides an output to said data memory and to said means for outputting; and a tag register which stores vector operand information in said vector string instructions.

6. A computer as recited in claim 5 wherein said means for sequencing includes:

a microprogram control unit that has a variety of means for addressing said program memory under control of said microinstructions in said microinstruction register;

a conditional microaddress bus that has means for selecting a source of a variety of inputs to said microprogram control unit, said means for selecting being under control of said microprogram;

means for interrupting a microprogram routine where an input/output microprogram routine is required;

a control multiplexer which addresses a next microinstruction to be transferred from said read-only memory to said microprogram register for execution under control of said microprogram.

7. A computer as recited in claim 6 wherein said means for inputting includes:

means for storing serial digital input data means for extracting a destination in said data memory from said input data;

means for transferring said input data to said data memory in parallel; and means for converting analog data to parallel digital data.

8. A computer as recited in claim 7 wherein said means for outputting includes:

means for providing a parallel digital output from said parallel digital data;

means for storing parallel data to be output;

means for shifting said parallel digital data to produce serial digital data for outputting, means for converting digital data to analog data for outputting.

9. A variable architecture digital computer comprising:

a microprogram module containing a plurality of microprogram routines including a microprogrammed vector string routine, said microprogram module including a read-only memory in which said microprogram routines are contained, microinstructions of said microprogram routines being addressed by a means for sequencing and a microprogram register to which a particular microinstruction of a microprogram routine being executed is transferred from said read-only memory, said microprogram register having outputs to all modules of said computer to drive gate arrays and scale devices in each of said modules, said means for sequencing including a microprogram control unit that has a variety of means for addressing a program memory under control of said microinstructions in said microinstruction register, a conditional microaddress bus that has means for selecting a source of a variety of inputs to said microprogram control unit, said means for selecting being under control of said microprogram, means for interrupting a microprogram routine where an input/output microprogram routine is required, and a control multiplexer which addresses a next microinstruction to be transferred from said read-only memory to said microprogram register for execution under control of said microprogram;

an instruction module having an instruction register divided into a plurality of fields in excess of a number of bits of an instruction word, said instruction module providing means for parsing words in fields under control of said microprogram routines, said instruction register in a form of, in an input mode, two parallel registers whose input to a least significant register is from said memory module and whose input to a most significant register is from said least significant register and, when in an output mode, is treated as one register, said instruction module including a field select unit under control of a byte counter and a field from said microinstruction register which selects under control of said microprogram a next unused field in said instruction register, said field being right justified by said field select unit;

means for processing data to indicate a vector operand, a scalar operand, said means for processing data including a tag register to hold dimensional operand vector information under control of said microprogram routines;

a memory module having a memory divided into a program memory, a data memory, and a tag memory, said program memory being a source of instruction words and said tag memory being a source of said operand vector information being addressed by a program control unit whose inputs are from an address multiplexer;

a processor module means for performing operations on data from said data and program memories and said instruction register, said processor module including special register counters having means for performing vector operations under control of said microprogram routines, said processor module including an arithmetic logic unit which performs arithmetic and logical functions upon two operands from a variety of sources, stores results in one of a variety of targets, contains said two special register counters for said vector operations, a particular function to be performed being determined by a particular microinstruction in said microinstruction register, a write multiplexer which has inputs from means for inputting, from said arithmetic logic unit, from said program control unit, from said memory module, and from a control multiplexer, and provides an output to said data memory and to means for outputting, and a unique tag register which stores vector operand information in said vector string instructions;

means for inputting and means for outputting a variety of data to and from said data memory under control of said microprogram module, said means for inputting including a means for storing serial digital input data, a means for extracting a destination in said data memory from said input data, a means for transferring said input data to said data memory in parallel, and means for converting analog data to parallel digital data, said means for outputting and including means for providing a parallel digital output from said parallel digital data, means for storing parallel data to be output, means for shifting said parallel digital data to produce serial digital data for outputting, means for converting digital data to analog data for outputting;

means for controlling operations of each element of said computer under control of said microprogram module; and means for performing real-time diagnostic routines to determine whether logical faults are occurring in said computer during real-time processing.

* * * * *